United States Patent [19]

Kumagai et al.

[11] Patent Number: 5,401,785
[45] Date of Patent: Mar. 28, 1995

[54] FOAMED POLYURETHANE-FORMING COMPOSITION, FOAMED POLYURETHANE AND PROCESS MAKING THE SAME

[75] Inventors: Yasushi Kumagai, Uji; Sukeo Ban, Kusatsu; Yuichi Sasatani, Kyoto, all of Japan

[73] Assignee: Sanyo Chemical Industries, Ltd., Kyoto, Japan

[21] Appl. No.: 173,875

[22] Filed: Dec. 27, 1993

Related U.S. Application Data

[63] Continuation of Ser. No. 697,623, May 9, 1991, abandoned.

[30] Foreign Application Priority Data

May 31, 1990 [JP] Japan ................................ 2-144164

[51] Int. Cl.$^6$ .............................................. C08G 18/08
[52] U.S. Cl. ..................... 521/112; 521/120; 521/123; 521/124; 521/133; 521/137; 521/172; 521/175
[58] Field of Search ............... 521/54, 112, 120, 123, 521/124, 133, 137, 172, 175

[56] References Cited

U.S. PATENT DOCUMENTS

| | | | |
|---|---|---|---|
| 3,928,258 | 12/1975 | Alexander | 521/175 |
| 4,038,238 | 7/1977 | Cravens | 521/54 |
| 4,275,172 | 6/1981 | Barth et al. | 521/123 |
| 4,857,368 | 8/1989 | Klein | 427/393 |
| 4,882,363 | 11/1989 | Neuhaus | 521/122 |

FOREIGN PATENT DOCUMENTS

| | | |
|---|---|---|
| 0069163 | 1/1983 | European Pat. Off. |
| 0070324 | 1/1983 | European Pat. Off. |
| 0341210 | 11/1989 | European Pat. Off. |
| 60-035016 | 2/1985 | Japan |
| 63-003166 | 1/1988 | Japan |
| 1-0035012 | 7/1989 | Japan |
| 1-0040866 | 8/1989 | Japan |
| 1-0059306 | 12/1989 | Japan |
| 1306372 | 2/1973 | United Kingdom |
| 1333088 | 10/1973 | United Kingdom |
| 1460863 | 1/1977 | United Kingdom |
| 2116574 | 9/1983 | United Kingdom |

*Primary Examiner*—John Kight, III
*Assistant Examiner*—R. F. Johnson
*Attorney, Agent, or Firm*—Oblon, Spivak, McClelland, Maier, & Neustadt

[57] ABSTRACT

Foamed polyurethanes substantially free from non-uniform density distribution are obtained by dispersing an inert gas with mechanical stirring into a foamed polyurethane-forming composition containing substantially no blowing agent and comprising (1) an organic polyisocyanate component, (2) a polyol component comprising a high molecular weight polyol (A1) and a low molecular weight polyol (A2), (3) a dehydrating agent (B) and optionally organic microballoons, and curing the resulting composition containing therein the inert gas substantially homogeneously distributed. Foamed polyurethanes thus obtained are lightweight and of reduced warpage after processing and are suitable for model materials.

30 Claims, 1 Drawing Sheet

FOAMED POLYURETHANE-FORMING COMPOSITION, FOAMED POLYURETHANE AND PROCESS MAKING THE SAME

This application is a continuation of application Ser. No. 07/697,623, filed on May 9, 1991, now abandoned.

BACKGROUND OF THE INVENTION

1. Field of the Invention

This invention relates to a foamed polyurethane-forming composition, a foamed polyurethane and a process making the same. More particularly, it relates to a composition and process capable of providing a foamed polyurethane substantially free from non-uniform density distribution and suitable for model materials, and such a formed polyurethane.

2. Description of the Prior Art

There have been proposed techniques for producing rigid polyurethane foams of reduced non-uniform density distribution, with use of microballoons and blowing agents.

Rigid polyurethane foams thus prepared, however, have non-uniform density distribution remained undiminished, and it is inevitable to cause warpage after processing for producing model materials.

SUMMARY OF THE INVENTION

It is an object of the present invention to provide a foamed polyurethane substantially free from non-uniform density distribution.

It is another object of this invention to provide a lightweight and homogenous density foamed polyurethanes with low cost.

It is still another object of the invention to provide a foamed polyurethane showing reduced warpage after processing and suitable for model materials.

It is yet another object of the present invention to provide a foamed polyurethane-forming composition capable of providing foamed polyurethanes substantially free from non-uniform density distribution suitable for model materials.

Briefly, these and other objects of the present invention as hereinafter will become more readily apparent have been attained broadly by a process for producing a foamed polyurethane, which comprises dispersing an inert gas with mechanical stirring into a foamed polyurethane-forming composition, and curing the resulting composition containing therein the inert gas substantially homogeneously distributed to obtain a foamed polyurethane; said polyurethane-forming composition comprising (1) an organic polytsocyanate component,
(2) a polyol component comprising a high molecular weight polyol (A1) and a low molecular weight polyol (A2), and
(3) at least 1 part, per 100 parts of the polyol component, of a dehydrating agent (B), with or without organic microballoons, and said polyurethane-forming composition contains substantially no blowing agent.

BRIEF DESCRIPTION OF THE DRAWINGS

In FIG. 1, the arrow (→) represents the direction of cutting.

DETAILED DESCRIPTION OF THE PREFERRED EMBODIMENTS

(1) Organic Polyisocyanate Component

Figure 1:
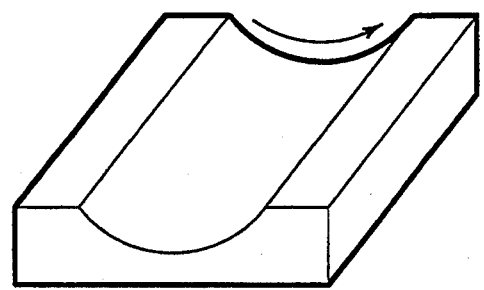
FIG. 1 is a perspective view of the test piece for evaluation of cutting proccessability.

As the polytsocyanate component, there may be used those used heretofore for producing polyurethanes. Suitable organic polyisocyanates include aromatic polyisocyanates containing 6–20 carbon atoms (except carbon atoms in NCO groups), aliphatic polyisocyanates containing 2–18 carbon atoms, allcyclic polyisocyanates containing 4–15 carbon atoms, araliphatic polyisocyanates containing 8–15 carbon atoms, and modified polytsocyanates of these polyisocyanates containing urethane, carbodiimide, allophanate, urea, bluret, urethdione, urethonimine, isocyanurate and/or oxazolidone groups. Illustrative examples of polylsocyanates are: aromatic polyisocyanates, such as 1,3-and/or 1,4-phenylene diisocyanates, 2,4-and/or 2,6-tolylene diisocyanate (TDI), crude TDI, diphenylmethane-4,4'- and-/or -2,4'- diisocyanates (MDI), crude MDI [fosgenated products of crude diaminodiphenylmethane {condensation products of formaldehyde with an aromatic amine (such as aniline) is a mixture thereof: mixtures of diaminodiphenylmethane with a minor amount (such as 1–20% by weight) of polyamine of 3 or more amino groups}: Polyaryl Polytsocyanates (PAPI) or Polymethylene-polyphenylene Polyisocyanates], naphthalene-1,5-diisocyanate, triphenylmethane-4,4',4''-triisocyanate, m- and/or p-tsocyanatophenyl sulfonyl isocyanate, and the like; aliphatic polyisocyanates, such as ethylene diisocyanate, tetramethylene diisocyanate, hexamethylene diisocyanate (HDI), dodecamethylene diisocyanate, 1,6,11-undecane triisocyanate, 2,2,4-trimethyl-HDI, lysine diisocyanate, 2,6-diisocyanatomethyl caproate, bis(2-isocyanato-ethyl) fumarate, bis(2-isocyanato-ethyl) carbonate, 2-isocyanato-ethyl-2,6-diisocyanato-hexanoate, and the like; alicyclic polyisocyanates, such as isophorone diisocyanate (IPDI), dicyclohexylmethane diisocyanate (hydrogenated MDI), cyclohexane diisocyanate (CHDI), methylcyclohexylene diisocyanate (hydrogenated TDI), hydrogenated xylylene diisocyanate, bis(2-isocyanato-ethyl) 4-cyclohexene-1,2-dicarboxylate, and the like; araliphatic polyisocyanates, such as xylylene diisocyanates (XDI), diethyl-benzene diisocyanates, and the like; modified Polyisocyanates, such as modified MDIs (such as carbodiimide-modified MDI, trihydrocarbyl phosphate-modified MDI), modified TDIs (such as urethane-modified TDI, isocyanurate-modified TDI), isocyanurate-modified IPDI, and the like; as well as mixtures of two or more of them, such as combination of modified MDI with urethane-modified TDI. Suitable polyols used for producing urethane modified polylsocyanates [Isocyanate-terminated prepolymer obtained by reacting a polyol with an excess of a polyisocyanate (such as TDI and/or MDI) ] include polyols having an equivalent weight of 30–200, for example, glycols, such as ethylene glycol, propylene glycol, diethylene glycol and dipropylene glycol; triols, such as trimethylol propane and glycerol; and polyols of higher functionality, such as pentaerythritol and sorbitol; as well as alkylene oxide (such as ethylene oxide and/or propylene oxide) adducts of these polyols. Among these polyols, preferred are those containing 2 or 3 hydroxyl groups. Isocyanate equivalent of these modified polyisocyanates and prepolymers is usually 130–280, preferably 145–230. Among these polyisocyanates, preferred are aromatic polyisocyanates. Particularly preferred are 2,4- and 2,6-TDI and mixtures of these isomers [such as TDI-80 (2,4TDI 80%) and TDI-65 (2,4-TDI 65%)], crude TDI, 4,4'- and 2,4'-MDI and mixtures of these isomers, crude MDI, and modified polyisocyanates of these polyisocyanates containing urethane, carbodiimide, allophanate, urea, biuret and/or isocyanurate groups. The most preferred is crude MDI.

(2) Polyol Component (A1) High Molecular Weight Polyol

Suitable high molecular weight polyols include, for example, polyether polyols, polyester polyols, castor oil polyols, other polyols, and mixtures of two or more of them.

Suitable polyether polyols are those obtainable by ring-opening polymerization of alkylene oxide or by addition of alkylene oxide to one or more compounds containing at least two (preferably two to eight) active hydrogen atoms, such as polyhydric alcohols, polyhydric phenols, amines, polycarboxylic acids, phosphoric acids and the like, and mixtures of two or more of them. Illustrative of such polyhydric alcohols are diols, for example, alkylene glycols, such as ethylene glycol, propylene glycol, 1,3-and 1,4-butane diols, 1,6-hexane diol, 3-methyl-1,5-pentane diol, neopentyl glycol, diethylene glycol, and the like, and cyclic group-containing diols, as written in JPN Patent Publication No. 1474/1970, such as bis(hydroxy-methyl) cyclohexane, bis(hydroxyethyl) benzene, and the like; trihydric alcohols, such as glycerol, trimethylolpropane, trimethylolethane, hexane triols, and the like; tetrahydric alcohols, such as pentaerythritol, alpha-methylglucoside, diglycerol, and the like; and polyols having higher functionality (5–8 or higher), for instance, sugar alcohols, such as sorbitol and mannitol, saccharides, such as sucrose, glycosides, such as glucosides of polyols (such as di-, tri- and tetrahydric alcohols as above), poly(alkane polyol)s, such as tri- and tetraglycerols, and di- and tripentaerythritols, and cycloalkane polyols, such as tetrakis(hydroxymethyl) cyclohexanol. Exemplary of suitable polyhydric phenols are mononuclear phenols, such as hydroquinone, catechol, resorcin, pyrogallol and phloroglucinol, and polynuclear phenols, for example, bisphenols, such as bisphenol A, bisphenol F, bisphenol sulfon and the like, as well as phenol-formaldehyde condensation products (novolaks), such as polyphenols as disclosed in U.S. Pat. No. 3,265,641. Suitable amines are inclusive of ammonia; alkanol amines, such as mono-, di- and tri- ethanol amines and mono-, di- and tri- iso-propanol amines, and aminoethyl ethanol amine and the like; aliphatic, aromatic, araliphatic and allcyclic monoamines, for example, $C_1$–$C_{20}$ alkyl amines (such as methyl, ethyl, iso-propyl, butyl, octyl and lauryl amines), aniline, toluidine, naphthyl amines, benzyl amine, cyclohexyl amine and the like; aliphatic, aromatic, araliphatic and allcyclic polyamines, such as $C_2$–$C_6$ alkylene diamines (such as ethylene, propylene and hexamethylene diamines), polyalkylene polyamines (such as diethylene triamine, triethylene tetramine and the like), aromatic diamines (such as tolylene diamines, phenylene diamines, xylylene diamines, methylene dianilines, diphenylether diamines and the like), allcyclic diamines (such as isophorone diamine, cyclohexylene diamines, dicyclohexylmethane diamines and the like); and heterocyclic polyamines, such as piperazine, N-aminoethylpiperazine and other heterocyclic polyamines, described in JPN Patent Publication No. 21044/1980. Suitable polycar boxylic acids include those described bellow in the description of polyester polyols. Among these active hydrogen atom-containing compounds, preferred are polyhydric alcohols, such as ethylene glycol, propylene glycol, 1,4-butane diols, 1,6-hexane diol, neopentyl glycol, diethylene glycol, glycerol, trimethylolpropane, pentaerythritol, alphamethylglucoside, sorbitol and sucrose. More preferred are dihydric and trihydric alcohols.

Suitable alkylene oxides, employed for producing polyether polyols, include, for example, ethylene oxide (hereinafter referred to as EO), propylene oxide (hereinafter referred to as PO), 1,2-, 2,3-, 1,3- and 1,4-butylene oxides, iso-butylene oxide, styrene oxide, epichlorohydrtn and the like, as well as combinations of two or more of them (block and/or random addition). Among these, preferred are PO, and combinations of PO and EO (the content of EO in the total alkylene oxides is preferably not more than 25% by weight).

Illustrative of polyether polyols are polypropylene glycols, Polytetramethyleneglycols, and PO adducts of glycerol, trimethylolpropane, pentaerythritol, sorbitol and sucrose.

Suitable polyester polyols are inclusive of polycondensation products of polyols with dicarboxylic acids or ester-forming derivatives thereof (such as arthydrides, esters and halides), polylactone polyols obtainable by ring-opening polymerization of lactones in the presence of polyols, polycarbonate polyols obtainable by reaction of carbonate diesters with polyols, and castor oil polyols.

Illustrative of suitable dicarboxylic acids and derivatives thereof, used for producing polycondensation polyester polyols, are aliphatic or cycloaliphatic dicarboxylic acids, such as glutaric, adipic, sebacic, fumaric and maleic acids, and dimeric acids; aromatic dicarboxylic acids, such as phthalic, isophthalic and terephthalic acids; tribasic or higher functional polycarboxylic acids, such as pyromellitic acid; as well as anhydrides and lower alkyl esters, such as maleic anhydride, phthalic anhydride and dimethyl terephthalate. Among these preferred are adipic acid, phthalic anhydride, and terephthalic acid or dimethyl ester thereof. Suitable polyols include low molecular weight polyols (such as polyhydric alcohols mentioned above as the raw materials for polyether polyols) and low mole (usually 1–3 moles) alkylene oxide adducts thereof. Among these, preferred are dihydric alcohols (such as ethylene glycol, propylene glycol, 1,4-butane diol, 1,6-hexane diol, neopentyl glycol and diethylene glycol) or combinations thereof with trihydric or higher functional polyhydric alcohols (such as glycerol and trimethylolpropane)]. More preferred are 1,4-butane diol, ethylene glycol and diethylene glycol.

Examples of suitable lactones include epsiloncaprolactone and delta-valerolactone. Preferred is epsiloncaprolactone. Suitable carbonate diesters include, for example, dialkyl carbonates, such as dimethyl carbonate and diethyl carbonate.

Castor oil polyols are inclusive of castor oil, hydrogenated castor oils, and low mole (usually 1–3 moles) alkylene oxide (such as EO and/or PO) adducts of them. Preferred is castor oil.

Examples of suitable other polyols of (A1) are polybutadiene polyols; vinyl polymers containing hydroxyl groups, such as acrylic polyols, as written in JPN Patent Lay-open Nos. 57413/1983 and 57414/1983; and polymer/polyols obtainable by polymerization of ethylenically unsaturated monomers (such as acrylonitrile, styrene and the like) in situ in polyols (polyether polyols and/or polyester polyols, with or without low molecular weight. polyols), for example, those written in U.S. Pat. No. 3,383,351, JPN Patent Publication Nos. 24737/1964 and 47597/1972, and JPN Patent Lay-open Nos. 15894/1975 and 118948/1880.

Among these high molecular weight polyols (A1), preferred are polyether polyols and particularly castor oil.

Hydroxyl number of high molecular weight polyols (A1) is less than about 300, preferably 20-250, more preferably 50-200.

(A2) Low Molecular Weight Polyol

Low molecular weight polyols include polyhydric alcohols, as described above as the raw materials for polyether polyols; low molecular weight alkylene oxide adducts of active hydrogen atom-containing compounds [such as alkylene oxide (1-10 moles) adducts of polyhydric alcohols and alkylene oxide (1-8 moles) adducts of amines, as described above]; low molecular weight polylactone polyols (such as polycaprolactone polyols); and mixtures of two or more of them. Among these, preferred are nitrogen-free polyols (hydrocarbon polyols which may contain one or more ether Groups), such as polyhydric alcohols and alkylene oxide (1-10 moles) adducts of polyhydric alcohols. More preferred are polyhydric alcohols, containing 3-8 hydroxyl groups, such as glycerol, trimethylolpropane, pentaerythritol, alpha-methylglucoside, diglycerol, sorbitol and sucrose (particularly glycerol, pentaerythritol and sorbitol); and alkylene oxide (PO and/or EO) of these polyhydric alcohols.

Hydroxyl number of low molecular weight polyols (A2) is usually 300-1000 or higher, preferably 350-800.

Generally, the polyol component (2) in the present invention, comprises 5-50% (preferably 15-40%) of high molecular weight polyol (A1) and 50-95% (preferably 60-85% of low molecular weight polyol (A2). In the above and hereinafter, % represents % by weight, unless otherwise specified. In case where (A1) is used in higher amount than above, the resulting foamed polyurethane articles become too soft, and sufficient hardness required for model materials is not attained. Use of larger amount of (A2) than above results in too hard and brittle foamed polyurethane articles to be easily cut and processed into model materials.

The ratio of the organic polyisocyanate (1) and active hydrogen atom-containing compounds comprising the polyol component (2) can vary widely. The equivalent ratio of NCO group/active hydrogen atom-containing group ratio may be usually 0.5/1-1.5/1, preferably 0.9/1-1.1/1. There may be used higher NCO ratio (for instance, the equivalent ratio of 1./1-50/1) to produce foamed polyisocyanurate.

(3) Additives or Auxiliaries (B) Dehydrating agent

Suitable dehydrating agents (B) used in this invention include neutral or basic (alkaline) dehydrants, for example, hydroxides, oxides and salts (such as sulfates, chlorides, silicates and the like) of metals falling within the groups II [II-A(alkaline earth metals, such as Mg, Ca, Ba) and II-B (such as Zn, Cd)], III (such as Al) and IV (such as Sn, Zr, Pb) of periodic table; as well as mixtures, double salts or complexes containing these compounds. Illustrative examples of these dehydrants are calcium oxide, barium oxide, calcium sulfate (gypsum: crystaline gypsum, calcined gypsum and anhydrous gypsum), barium sulfate, calcium chloride, zeolite (sodium aluminosilicate and sodium potassium aluminosilicate) and the like. Among these, preferred are calcium sulfate and zeolite.

Particle size of dehydrating agents is usually 0.1-20 microns.

The amount of dehydrant (B) is usually at least 1 part (such as 1-10 parts or more), preferably 1-8 parts, more preferably 2-5 parts, per 100 parts of the polyol (2). In the above and hereinafter, parts represents parts by weight, unless otherwise specified. Use of less than 1 part of (B) causes foaming reaction of NCO group with water absorbed and is liable to produce foamed polyurethane articles of non-uniformly distributed density. Use of too larger amount of (B) provides no further improvement and results in products of poor cutting processability for model materials.

(C) Organic microballoon

Suitable organic microballoons (hollow microspheres), used optionally in the invention, include closed cell hollow spheres of resins. Examples of suitable resins are thermosetting resins, such as phenolic resins, epoxy resins, urea resins and the like; and thermoplastic resins, such as polyvinylidene resins, acrylic resins (such as polyacrylonitrile and polymethylmethacrylate), acrylic modified styrenes polymers, copolymers of styrene and methyl methacrylate, and the like. Particle size of organic microballoons is generally 5-500 microns, preferably 10-250 microns, and bulk density of organic microballoons is usually 0.01-0.35 gr./cm$^3$. Illustrative of suitable microballoon are Phenolic microballoon (phenolic resin microballoon, produced by Union Carbide), Matsumoto microspheres F-80ED (polyacrylonitrile resin microballoon, produced by Matsumoto Yusht-Seiyaku, Co. Ltd.), Saran microsphere (polyvinylidene chloride resin microballoon, produced by Dow Corning), Ecosphere EP (epoxy resin microballoon, produced by Emerson & Comming) and Ecosphere VF-O (urea resin microballoon, produced by Emerson & Comming). Among these, preferred are phenolic microballoon and saran microsphere.

Organic microballoon (C) is used in such an amount of usually at least 3 parts (such as 3-30 parts or more), preferably 3-25 parts, more preferably 5-20 parts, per 100 parts of the polyol (2). Use of less than 3 part of (C) is liable to produce products of non-uniformly distributed density; while using too much amount of (C) causes considerable bodying and difficulty in mixing, and cannot provide homogeneous articles.

(D) Carboxylic Acid Derivatives

If desired, there can be used in this invention one or more carboxylic acid derivatives selected from the group consisting of metal salts (D1) and amides (D2) of carboxylic acids, to improve cutting processability.

Suitable carboxylic acids constituting metal salts (D1) include fatty acid containing 12-20 carbon atoms, including straight-chain or blanched, saturated or unsaturated ones, for example, tall oil fatty acid, linoleic, abietic, oleic, stearic, palmitic and myristic acids, and the like. Among these, preferred are linoleic and stearic acids. Suitable metals forming salts with these acids are metals of group II of periodic table, including alkaline earth metals, such as Mg, Ca and Ba; and Zn, Cd and the like. Among these, preferred are Ca and Zn. Illustrative examples of (D1) are barium oleate, calcium stearate, zinc linoleate and magnesium palmitate. Preferred are calcium stearate and zinc linoleate.

Suitable carboxylic acids constituting amides (D2) are inclusive of mono- and polycarboxylic acids containing 12-40 carbon atoms. Examples of suitable carboxylic acids are fatty acid containing 12-20 carbon atoms as mentioned above; and polymerized fatty acids containing 24-40 carbon atoms or more, as written in JPN Patent Publication Nos. 41121/1978 and 41122/1978, for example, polymerized acids (dimer acids) derived from unsaturated fatty acids (usually $C_{18}$: such as linoleic, linolenic and oleic acids). Suitable amine component forming amides (D2) include mono- and diamines containing 1-5 carbon atoms, for instance, ammonia; alkanol amines, such as monoethanol amine; and alkylenediamines, such as ethylenediamine and propylenediamine. Preferred are monoethanol amine and ethylenediamine. Exemplary of (D2) are stearylamide, ethylenediamine stearylamide, and oleic acid monoethanol amide. Among these, preferred are ethylenediamine stearylamide, and oleic acid monoethanol amide.

The amount of carboxylic acid derivatives (D) [metal salts (D1) and/or amides (D2)] is usually at least 2 parts (such as 2-20 parts or more), preferably 2-15 parts, more preferably 4-10 parts, per 100 parts of the polyol (2). Use of less than 2 part of (D) results in poor cutting processability; whereas too larger amount of (D) is liable to bleed out of the surface of foamed polyurethane articles.

(E) Surfactants or Foam Stabilizers

There can be used one or more surfactants or foam stabilizers, such as silicone surfactants. Suitable silicone surfactants include polysiloxane-polyoxyalkylene copolymers used as foam stabilizer in producing usual polyurethane foams. Preferred are ones having higher foam-stabilizing action, which include those for flexible slab foams and those for rigid foams. Illustrative of such foam stabilizers are silicone surfactants for flexible slab foams, such as SH-190 (produced by Toray Silicone), and L-520 and SZ-1127 (produced by Nippon Unicar); and those for rigid foams such as SH-193 and SH-195 (produced by Toray Silicone), L-5420, SZ-1672 and SZ-1931 (produced by Nippon Unicar). Particularly preferred are SH-190 and SZ-1672.

Surfactant (E) may be used, for instance, in an amount of about 2- about 10 parts or higher, preferably 3-8 parts, per 100 parts of the polyol component (2). When (E) is used in an amount of less than 2 parts, inert gas dispersed in the composition is not sufficiently maintained stably within the composition and makes it difficult to obtain uniform density distribution desired; whereas using (E) too much is liable to cause bleeding cut on the surface of foamed articles.

(F) Catalysts

There may be used catalysts, usually employed in producing polyurethanes and/or polyureas, for example, amine catalysts, such as triethylenediamine, N-ethylmorpholine, diethylehanoline, 1,8-diazabicyclo(5,4,0)undecene-7 and so on; tin-containing catalysts, such as stannous octoate, dibutyltin dilaurate and the like; and other metal-containing catalysts, such as lead octoate. NCO-trimerization catalysts (such as those disclosed in U.S. Pat. No. 4,299,924) may also be used to produce foamed polyisocyanulates. The catalysts (F) can be used, for instance, in an amount of about 0.001— about 5%, based on the weight of the reaction mixture.

(G) Other Additives or Auxiliaries

If necessary, there may be used one or more additives or auxiliaries [except blowing agents (water, and volatile liquids, such as freons)], usually employed in producing polyurethanes, for example, colorants, such as dyes and pigments (inorganic pigments, such as titanium oxide, carbon black, red oxide, yellow oxide and the like; and organic pigments, such as phthalocyanine blue, phthalocyanine green and the like); plasticizers, such as those disclosed in U.S. Pat. Nos. 3,523,984 and 4,518,729 [phthalates (such as dioctyl phthalate), adipates (such as dioctyl adipate), sebacates (such as dioctyl sebacate), phosphates (such as tricresyl phosphate) and the like]; extenders and fillers, such as inorganic fillers (for example, clay, such as kaolin and china clay, diatomaceus earth, calcium carbonate, talc, alumina, silica, vermiculite and the like) and organic fillers (such as cellulose powders, powdered rubbers and reproduced rubbers and the like), and other compounding additives (natural and synthetic resins, such as cellulose derivatives, vinyl chloride resins, phenolic resins, ketone resins, synthetic rubbers, unsaturated polyester resins, epoxy resins, melamine resins, urea resins, rosin resins and the like); flame-retardants [such as phosphorus-containing ones, halogen(such as bromine)-containing ones and antimony oxide]; stabilizers [age stabilizers (such as UV absorbers), antioxidants (such as hindered phenols and hindered amines) and the like]; various auxiliaries, such as pigment dispersants, antistatic agents, and so on.

Additives or auxiliaries [dehydrating agent (B), organic microballoon (C), carboxylic acid derivatives (D) {(D1) and (D2)}, surfactant (E), catalysts (F) and others (G)] may be added beforehand to any of the organic polyisocyanate component (1) and the polyol component (2), or both, or they may be added separately during mixing of these components (1) and (2). It is preferred to add (B), (C), (D), (E), (F) and/or (G) to the component (2). It is also preferred to add (B), (C), (D), (E), (F) and (G) to the component (1). By adding (G) to (1), it can be attained to suppress foaming upon reaction of NCO group with water (trace water in the polyol component and moisture in the atmosphere) due to reduced NCO-content, whereby non-uniform density distribution can be remarkably diminished and more homogeneous foamed polyurethane articles can be obtained.

(4) Production of Foamed Polyurethanes

Techniques of producing foamed polyurethanes may be the same as the prior arts, for example, those described in "POLYURETHANE" (published 1960, Makl-shoten, Japan), and "POLYURETHANES Chemistry and Technology", Part I. Chemistry (published 1962, Interscience Publishers). There can be used any of one-shot process, prepolymer process (quasi-prepolymer process), or combinations of them (for instance, combination or crude MDI with prepolymer). Free NCO content of prepolymers is usually 10-40%, preferably 15-35 %, more preferably 20-30%.

Suitable inert gases used in the present invention are materials, gaseous at room temperature and preferably not liquified at $-30°$ C., which are non-reactive with the organic polyisocyanate component and polyol component; and include, for example, air, nitrogen gas, carbon dioxide gas and the like.

Dispersing of inert gas can be carried out by mechanical frothing. That is, the inert gas is introduced, under mechanical stirring, into the liquid phase (foamed polyurethane-forming composition) comprising the organic polyisocyanate component and the polyol component to obtain a foamed polyurethane-forming composition containing therein the inert gas substantially homogeneously distributed.

Mechanical stirring may be performed with use of high-shear mixers, including ones suitable for batchwise introduction of inert gas, such as Hobart mixers, and ones suitable for continuous introduction of the inert gas, such as Oakes mixers and the like. Mixing conditions may vary according to the mixing machine used. For instance, in case of stirring with an Oakes mixer, it is preferred to introduce the inert gas at a flow rate of 2–10 normal litters/minute under a pressure of 4–10 kg/cm²G into the composition of 4–10 litters/minutes at a temperature of 20°–40° C. Stirring with a Hobart mixer is preferably carried out at a velocity of 30–80 rpm for usually 1–20 minutes, preferably 3–10 minutes, to lower the density and reduce non-uniform density distribution. Stirring period less than 20 seconds is liable to result in non-uniform density distribution and consequently to cause warpage after processing.

The amount of the inert gas introduced into the foamed polyurethane-forming composition may be varied according to the desired properties of the final products, but it is general to use inert gas in such an amount of usually about 10%– about 70% by volume, preferably 20–60% by volume. The bulk density of the resulting foamed polyurethane articles is usually 0.3–0.9 g/cm³, preferably 0.4–0.8 g/cm³.

The resulting composition containing therein the inert gas distributed is poured or introduced into a mold and cured to obtain a foamed polyurethane article. Suitable molds include metal molds (for example, aluminum molds, iron molds, alloy molds such as stainless molds), and Teflon-coated molds.

Holding and curing may be carried out under the same conditions as those in conventional foamed polyurethane articles.

According to the present invention, occurrence of non-uniform distribution of density within the resulting foamed articles arisen from using blowing agents (water and/or volatile liquids such as freons) can be restrained or avoided; and lightweight foamed polyurethane articles, substantially free from non-uniform density distribution, having homogenous density and homogenous properties, can be obtained according to this invention.

Foamed articles of the invention have improved machinability or cutting processability and reduced warpage after processing, and accordingly are particularly useful for model materials or function as modeling stock.

Machining or cutting can be done using conventional tools or cutting machines, such as milling machines, machining centers and the like, into desired shapes. Shapes of the resulting products after cutting are not particularly restricted and can be varied according to the uses of the final products.

These articles can be used as substitute for natural wood and epoxy synthetic foam model blocks, and may be applied to produce master models, design models, tracing models, inspection jigs and blanks for verifying NC tapes.

Having Generally described the invention, a more complete understanding can be obtained by reference to certain specific examples, which are included for purposes of illustration only and not intended to be limiting unless otherwise specified.

In the following examples, parts, ratio and % mean parts by weight, weight ratio and % by weight, respectively.

In the following Examples, POA represents PO adduct. Polyisocyanate components used in Examples are as follows: Millionate MR-200 and Millionate MR-100 are crude MDIs (NGO 30.5%) and Millionate 143L is a modified MDI (NCO 26%), all produced by Nippon Polyurethane. Prepolymer I is a urethane prepolymer (NCO 28%) prepared from castor oil and TDI-80.

EXAMPLES 1–4

According to the formulations written in Table 1, the polyisocyanate component was added to the premix comprising the polyol component and additives, and the mixture was stirred with a Hobart mixer for 5 minutes at a speed of 60 r.p.m. to disperse air thereinto, and the resulting composition containing air dispersed therein was introduced into an iron mold (20 cm length×30 cm width×5 cm height) maintained at a temperature of 35°–40° C., followed by closing the mold and curing the mixture within the mold. After an hour from stirring, the foamed product was demolded.

TABLE 1

|  | Example No. | | | |
|---|---|---|---|---|
|  | 1 | 2 | 3 | 4 |
| Glycerol POA (MW400) | 80 | — | — | — |
| Sorbitol POA (MW750) | — | 75 | — | — |
| Pentaerythritol POA (MW555) | — | — | 75 | — |
| Glycerol POA (MW480) | — | — | — | 80 |
| Glycerol POA (MW1000) | — | 25 | — | — |
| Propyrene glycol POA (MW1000) | — | — | — | 20 |
| Castor oil | 20 | — | 25 | — |
| Phenolic microballoon BJO-0840 | 8 | — | — | — |
| Phenolic microballoon BJO-0930 | — | — | 7 | — |
| Saran microsphere XD-7051 | — | 5 | — | 5 |
| Ca stearate | 5 | — | — | — |
| Zn stearate | — | 8 | — | — |
| Ethelenediamine distearylamide | — | — | 6 | — |
| Oleic acid monoethanolamide | — | — | — | 8 |
| CaO | 3 | — | — | — |
| CaSO₄.1/2H₂O | — | 4 | — | — |
| Zeolite (Molecular sieves 3A) | — | — | 2 | — |
| CaCl₂ | — | — | — | 5 |
| Silicone SH-193 | 4 | — | — | — |
| Silicone SH-190 | — | — | 5 | — |
| Silicone L-520 | — | 3 | — | — |
| Silicone SZ-1627 | — | — | — | 5 |
| Millionate MR-200 | 95 | — | — | — |
| Millionate MR-100 | — | — | 88 | — |
| Millionate 143L | — | 115 | — | — |
| Prepolymer I | — | — | — | 85 |

EXAMPLE 5

Example 1 was repeated except that 5 parts of Phenolic microballoon BJO-0930 was added to Millionate MR0 instead of adding Phenolic microballoon BJO-0840 to the polyol component.

Comparative Example 1

Example 1 was repeated without using CaO.

Comparative Example 2

Example 1 was repeated except that the period of stirring with the hobalt mixer was reduced to 20 seconds to restrain dispersion of air.

With regard to these resulting foamed polyurethane articles, density distribution and warpage after cutting with an NC milling machine were measured as follows:

(1) Density distribution:

Each foamed polyurethane was cut into slices of 5 mm thick, and density of each slice was measured. The maximum density, the minimum density and the difference of them were shown in Table 2.

Figure 2:
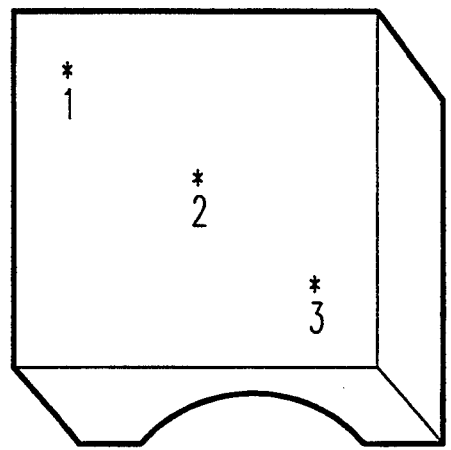
FIG. 2 is a perspective view to show the points for measuring displacement before and after cutting.

(2) Warpage test:

Each sample of 20 cm × 20 cm × 5 cm was cut into the shape shown in FIG. 1, under the following cutting processing conditions, and displacements (displaced distances) at the points shown in FIG. 2 before and after cutting were measured and shown in Table 2.

| NC milling machine: | CNC Roota NCE-23-1F |
|---|---|
| Cutting tool: | Ball end mill (φ12 Ultra hard bite) |
| Processing conditions: | 18,000 r.p.m. (number of rotation), |
| | 2,000 mm/min. (feed velocity), |
| | 2 mm (interval of cut) |
| | 40 mm (maximum depth of cut) |

TABLE 2

| Example No. | Density distribution, g/cm$^3$ | | | Warpage, mm | | |
|---|---|---|---|---|---|---|
| | Max. | Min. | Difference | Point 1 | Point 2 | Point 3 |
| Example 1 | 0.71 | 0.67 | 0.04 | 0.02 | 0.18 | 0.04 |
| 2 | 0.58 | 0.51 | 0.07 | 0.03 | 0.24 | 0.02 |
| 3 | 0.68 | 0.64 | 0.04 | 0.00 | 0.20 | 0.03 |
| 4 | 0.62 | 0.54 | 0.08 | 0.02 | 0.22 | 0.01 |
| 5 | 0.63 | 0.60 | 0.03 | 0.03 | 0.16 | 0.00 |
| Comparative 1 | 0.80 | 0.65 | 0.15 | 0.04 | 0.35 | 0.06 |
| Example 2 | 0.98 | 0.86 | 0.12 | 0.06 | 0.32 | 0.02 |

EXAMPLE 6

Comparative Example 3

Example 1 and Comparative Example 1 were repeated without using Phenolic microballoon BJO-0840. The results were as shown in Table 3.

TABLE 3

| Example No. | Density distribution, g/cm$^3$ | | | Warpage, mm | | |
|---|---|---|---|---|---|---|
| | Max. | Min. | Difference | Point 1 | Point 2 | Point 3 |
| Example 6 | 0.95 | 0.82 | 0.13 | 0.05 | 0.31 | 0.03 |
| Comparative Example 3 | 0.99 | 0.78 | 0.21 | 0.02 | 0.37 | 0.05 |

What is claimed as new and desired to be secured by letters Patent is:

1. A process for producing rigid formed polyurethanes suitable for model materials, which comprises dispersing an inert gas with mechanical stirring into a formed polyurethane-forming composition, containing substantially no blowing agent, comprising:
   (1) an organic polyisocyanate component,
   (2) a polyol component comprising about 5-50% by weight of a high molecular weight polyol (A1) having a hydroxyl number less than about 300 and about 50-95% by weight of a low molecular weight polyol selected from the group consisting of polyhydric alcohols containing 3-8 hydroxyl groups and alkylene oxide adducts of said polyhydric alcohols (A2) having a hydroxyl number of at least 300, and
   (3) at least 1 part by weight, per 100 parts by weight of the polyol component, of molecular sieves having 3 Angstrom pores of the zeolite type.

2. The process of claim 1, wherein (A1) is at least one polyol selected from the group consisting of polyether polyols, polyester polyols, castor oil polyols, polybutadiene polyols, vinyl polymers containing hydroxyl groups, and polymer/polyols.

3. The process of claim 1, wherein (A1) is polyether polyol obtained by addition of alkylene oxide to polynuclear phenols.

4. The process of claim 1, wherein (A1) has a hydroxyl number of 20-250.

5. The process of claim 1, wherein at least a part of (A1) is castor oil.

6. The process of claim 1, wherein (A2) has a hydroxyl number of 300-1000.

7. The process of claim 1, wherein at least a part of the polyisocyanate component (1) is a polymethylene-polyphenylene polyisocyanate.

8. The process of claim 1, wherein the organic polyisocyanate (1) and active hydrogen atom-containing compounds comprising the polyol component (2) are used in an amount providing the equivalent ratio of NCO group/active hydrogen atom-containing group of 0.5/1 to 50/1.

9. The process of claim 1, wherein the composition contains the molecular sieves of the zeolite type in an amount of 1-8 parts per 100 parts of the polyol component (2).

10. The process of claim 1, wherein the composition further contains an organic microballoon (C), in an amount of about 3 to about 30 parts per 100 parts of the polyol component (2).

11. The process of claim 10, wherein (C) is contained in the polyisocyanate component (1).

12. The process of claim 10, wherein (C) is selected from the group consisting of thermosetting resin microballoons and thermoplastic resin microballoons.

13. The process of claim 10, wherein (C) is a closed cell hollow sphere having a bulk density of 0.01-0.35 gr./cm$^3$.

14. The process of claim 1, wherein the composition further contains at least one carboxylic acid derivative (D) selected from the group consisting of metal salts (D1) and amides (D2) of carboxylic acids, in an amount of about 2 to about 15 parts per 100 parts of the polyol component (2).

15. The process of claim 1, wherein the composition further contains a polysiloxane-polyoxyalkylene copolymer (E), in an amount of about 2 parts to about 10 parts per 100 parts of the polyol component (2).

16. A process for producing rigid formed polyurethanes suitable for model materials, which comprises dispersing an inert gas with mechanical stirring into a foamed polyurethane-forming composition, containing substantially no blowing agent, comprising:
   (1) an organic polyisocyanate component,
   (2) a polyol component comprising about 5-50% by weight of a high molecular weight polyol (A1) having a hydroxyl number less than about 300 and about 50-95% by weight of a low molecular weight polyol selected from the group consisting of polyhydric alcohols containing 3-8 hydroxyl groups and alkylene oxide adducts of said polyhydric alcohols (A2) having a hydroxyl number of at least 300, and
   (3) at least 1 part by weight, per 100 parts by weight of the polyol component, of a neutral or basic compound selected from the group consisting of hydroxides, oxides and salts of metals falling within the groups II, III and IV of the periodic table; or a mixture, double salt or complex containing these compounds.

17. The process of claim 16, wherein (A1) is at least one polyol selected from the group consisting of polyether polyols, polyester polyols, castor oil polyols, polybutadiene polyols, vinyl polymers containing hydroxyl groups, and polymer/polyols.

18. The process of claim 16, wherein (A1) is polyether polyol obtained by addition of alkylene oxide to polynuclear phenols.

19. The process of claim 16, wherein (A1) has a hydroxyl number of 20-250.

20. The process of claim 16, wherein at least a part of (A1) is castor oil.

21. The process of claim 16, wherein (A2) has a hydroxyl number of 300-1000.

22. The process of claim 16, wherein at least a part of the polyisocyanate component (1) is a polymethylene-polyphenylene polyisocyanate.

23. The process of claim 16, wherein the organic polyisocyanate (1) and active hydrogen atom-containing compounds comprising the polyol component (2) are used in an amount providing the equivalent ratio of NCO group/active hydrogen atom-containing group of 0.5/1 to 50/1.

24. The process of claim 16, wherein the composition contains a neutral or basic compound selected from the group consisting of hydroxides, oxides, and salts of metals falling within the groups II, III and IV of the periodic table; or a mixture, double salt or complex in an amount of 1-8 parts per 100 parts of the polyol component (2).

25. The process of claim 16, wherein the composition further contains an organic microballoon (C), in an amount of about 3 to about 30 parts per 100 parts of the polyol component (2).

26. The process of claim 25, wherein (C) is contained in the polyisocyanate component (1).

27. The process of claim 25, wherein (C) is selected from the group consisting of thermosetting resin microballoons and thermoplastic resin microballoons.

28. The process of claim 25, wherein (C) is a closed cell hollow sphere having a bulk density of 0.01-0.35 $gr/cm^3$.

29. The process of claim 16, wherein the composition further contains at least one carboxylic acid derivative (D) selected from the group consisting of metal salts (D1) and amides (D2) of carboxylic acids, in an amount of about 2 to about 15 parts per 100 parts of the polyol component (2).

30. The process of claim 16, wherein the composition further contains a polysiloxane-polyoxyalkylene copolymer (E), in an amount of about 2 parts to about 10 parts per 100 parts of the polyol component (2).

* * * * *